United States Patent
Toda et al.

(10) Patent No.: US 9,901,976 B2
(45) Date of Patent: Feb. 27, 2018

(54) METHOD FOR MANUFACTURING CASTING USING LOST WAX PROCESS

(71) Applicants: CASTEM CO., LTD., Hiroshima (JP); SWANY CO., LTD., Nagano (JP)

(72) Inventors: Takuo Toda, Fukuyama (JP); Shusaku Sagara, Fukuyama (JP); Yoshihiro Hashizume, Ina (JP)

(73) Assignees: CASTEM CO., LTD., Hiroshima (JP); SWANY CO., LTD., Nagano (JP)

( * ) Notice: Subject to any disclaimer, the term of this patent is extended or adjusted under 35 U.S.C. 154(b) by 0 days.

(21) Appl. No.: 15/196,474

(22) Filed: Jun. 29, 2016

(65) Prior Publication Data

US 2017/0028460 A1    Feb. 2, 2017

(30) Foreign Application Priority Data

Jul. 29, 2015    (JP) .................................. 2015-149142

(51) Int. Cl.
| | |
|---|---|
| *B22C 9/04* | (2006.01) |
| *B22C 9/06* | (2006.01) |
| *B22C 7/02* | (2006.01) |
| *B33Y 10/00* | (2015.01) |
| *B33Y 80/00* | (2015.01) |

(52) U.S. Cl.
CPC .............. *B22C 7/02* (2013.01); *B22C 9/043* (2013.01); *B22C 9/065* (2013.01); *B33Y 10/00* (2014.12); *B33Y 80/00* (2014.12)

(58) Field of Classification Search
CPC .. B22C 7/02; B22C 9/04; B22C 9/043; B22C 9/065; B22D 17/2218; B29C 45/73

USPC .......................................... 164/45, 118, 348
See application file for complete search history.

(56) References Cited

U.S. PATENT DOCUMENTS

| | | | | |
|---|---|---|---|---|
| 4,240,493 A | * | 12/1980 | Wilmarth .................. | B22C 9/04 164/244 |
| 5,735,336 A | * | 4/1998 | Oti .......................... | B22C 9/067 164/34 |
| 6,112,804 A | * | 9/2000 | Sachs ...................... | B22C 9/065 164/348 |
| 7,100,672 B2 | * | 9/2006 | Park ........................ | B22D 27/04 164/312 |
| 7,413,001 B2 | * | 8/2008 | Wang ....................... | B22C 9/10 164/361 |

(Continued)

FOREIGN PATENT DOCUMENTS

| | | |
|---|---|---|
| JP | 9-122826 | 5/1997 |
| JP | 2000-254759 | 9/2000 |

*Primary Examiner* — Kevin E Yoon
(74) *Attorney, Agent, or Firm* — Greenblum & Bernstein, P.L.C.

(57) ABSTRACT

A wax pattern forming die to form a wax pattern is first fabricated, and a molten wax is poured into a cavity in the wax pattern forming die to fabricate the wax pattern. Subsequently, the wax pattern is bonded to a casting sprue pattern made of the wax and fabricated separately from the wax pattern to fabricate an integrated pattern, a surface of the integrated pattern is coated with ceramics, sintering is effected, then the integrated pattern is molten and effused to fabricate a mold to cast a casting with a casting sprue. Further, a molten metal is poured into the mold and cured, then the mold is crushed to take out the casting with the casting sprue, and the casting sprue is cut off from the casting with a casting sprue to fabricate a casting.

4 Claims, 6 Drawing Sheets

(56) References Cited

U.S. PATENT DOCUMENTS

| | | | |
|---|---|---|---|
| 8,561,668 B2* | 10/2013 | Castle | B29C 67/0051 164/28 |
| 8,894,401 B2* | 11/2014 | Oh | B29C 45/7306 264/328.16 |
| 2003/0098136 A1* | 5/2003 | Ludwig | B22C 7/02 164/35 |
| 2015/0165665 A1* | 6/2015 | Guichard | H05B 6/42 425/552 |

* cited by examiner

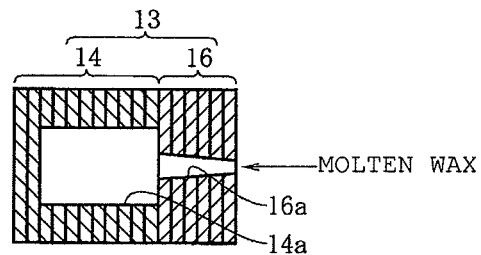
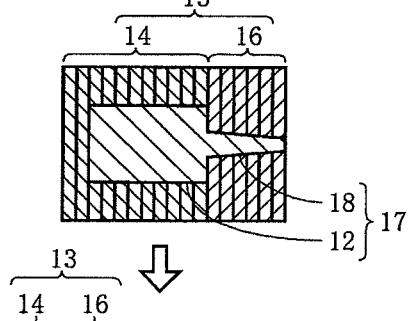
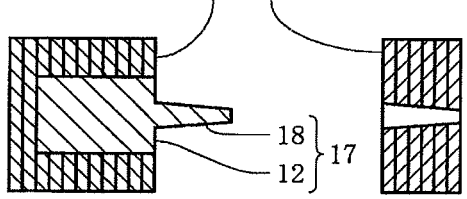
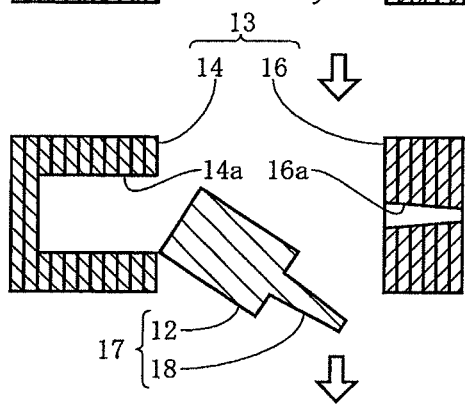
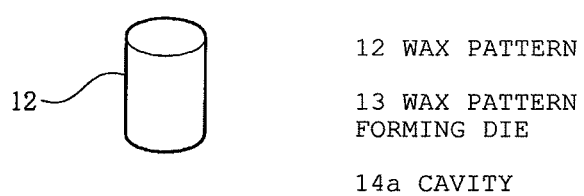
FIG.1(a)
FIG.1(b)
FIG.1(c)
FIG.1(d)
FIG.1(e)
12 WAX PATTERN
13 WAX PATTERN FORMING DIE
14a CAVITY 51 FIRST FLOW PATH
51a INLET OF FIRST FLOW PATH
52 SECOND FLOW PATH
52b OUTLET OF SECOND FLOW PATH
53 WAX PATTERN FORMING DIE
57 CAVITY
61 WATER TANK PUMP 57 CAVITY
81 FIRST CONCAVE PORTION
82 SECOND CONCAVE PORTION
83 WAX PATTERN FORMING DIE
91 FIRST HEATSINK
92 SECOND HEATSINK

METHOD FOR MANUFACTURING CASTING USING LOST WAX PROCESS

TECHNICAL FIELD

The present invention relates to a method for manufacturing a casting based on precision casting using a lost wax process. More specifically, the present invention relates to a method for manufacturing a casting by fabricating a wax pattern with the use of a wax pattern forming die fabricated by stereolithography or a three-dimensional printer.

BACKGROUND ART

There is disclosed a method for forming a wax pattern having a hollow structure by using a die including an upper die and a lower die (see, e.g., Patent Document 1). According to this method for forming a wax pattern having a hollow structure, a desired hollow structure is formed in the wax pattern before the wax pattern is taken out of the die. Further, a hollow structure forming member is arranged at a position corresponding to the hollow structure of the wax pattern of the die, and this hollow structure forming member is made of a wax and then removed from the wax pattern. Furthermore, the hollow structure forming member has solubility, and this hollow structure forming member is dissolved and removed from the wax pattern after the wax is cured.

According to the method for forming a wax pattern having a hollow structure configured as described above, since the desired hollow structure is formed in the wax pattern when the wax pattern is removed from the die, productivity of casting manufacture in a lost wax process can be considerably improved. Moreover, when a member that is integrated with a casting is previously arranged at a position corresponding to the hollow structure of the wax pattern of the die in place of forming the hollow structure in the wax pattern, a material different from a casting material such as ceramics can be integrated with the casting.

On the other hand, there is disclosed a method for manufacturing a precision casting mold by which a surface of an evaporative pattern made of a photocurable resin and formed into substantially the same shape as a casting is coated with a refractory to form a precursor of a mold, and an oxygen containing gas is blown into the precursor at temperatures equal to or more than a decomposition temperature of the photocurable resin to combust and remove the evaporative pattern (see, e.g., Patent Document 2). According to this method for manufacturing a precision casting mold, stereolithography can be used as a method for fabricating an evaporative pattern. This stereolithography is implemented by inputting three-dimensional shape data of a casting to a computer, and irradiating a predetermined position of a photocurable resin liquid with light (a laser beam, an ultraviolet ray, or the like) based on this value to cure the resin. Additionally, a cured part is moved in a height direction, the uncured resin liquid is irradiated with the light in the similar manner to sequentially cure the resin liquid in the height direction, thereby fabricating a resin pattern. When the stereolithography is used, since a pattern is directly fabricated from the three-dimensional shape data, the pattern having a complicated shape or a small wall thickness can be highly precisely and easily fabricated, and production efficiency of the mold can be also improved.

According to the thus configured method for manufacturing a precision casting mold, since sufficient oxygen can be supplied at the time of combusting a resin, ambient oxygen concentration can be prevented from lowering with combustion of the resin. Consequently, since combustion of the resin is promoted and the greater part of the resin is combusted and removed in a short time without stopping, a stress load added to the mold by thermal expansion of the resin is reduced, and destruction of the mold can be avoided. Further, when the greater part of the resin is removed, an influence of the thermal expansion of the resin on the mold can be ignored, and hence then a residue (soot) in the mold can be completely combusted and removed over sufficient time.

PRIOR ART REFERENCES

Patent Documents

Patent Document 1: Japanese Unexamined Patent Application Publication No. Hei 9-122826 (claims 1 to 3, paragraphs [0014], [0015], and [0068])

Patent Document 2: Japanese Unexamined Patent Application Publication No. 2000-254759 (claim 1, paragraphs [0012], [0025], and [0026])

SUMMARY OF THE INVENTION

Problems to be Solved by the Invention

However, since the conventional method for forming a wax pattern having a hollow structure disclosed in Patent Document 1 requires a large amount of costs for fabrication of a die for forming a wax pattern and also requires a relatively large amount of costs for changing a shape of the die, in case of manufacturing a prototype on a preliminary step of manufacturing mass-produced items, relatively many man-hours are required at the time of changing a shape of a cavity in the die, and an inconvenience, i.e., a large amount of costs occurs when the shape of the cavity is changed frequently. Further, according to the conventional method for manufacturing a precision casting mold shown in Patent Document 2, although an evaporative pattern is fabricated by using the stereolithography, since this evaporative pattern is made of a photocurable resin which is a material different from the wax, there is a problem that special facilities or the like are required to vanish the evaporative pattern made of the photocurable resin. Furthermore, according to the conventional method for manufacturing a precision casting mold disclosed in Patent Document 2, in case of manufacturing a prototype on a preliminary step of manufacturing mass-produced items, a mold is fabricated by using an evaporative pattern, and a casting which is the prototype is fabricated with the use of this mold but, to examine cutting conditions or a change in shape of this casting, a plurality of castings are required depending on situations, and there is a problem that a plurality of evaporative patterns must be successively fabricated by the stereolithography which relatively takes time.

It is a first object of the present invention to provide a method for manufacturing a casting using a lost wax process, which enables changing a shape of a wax pattern forming die with a relatively few man-hours even if the shape of the wax pattern forming die is changed frequently in case of, e.g., manufacturing a prototype on a preliminary step of manufacturing mass-produced items. It is a second object of the present invention to provide a method for manufacturing a casting using a lost wax process, which enables fabricating a wax pattern with the use of a regular wax and eliminates the need for special facilities and the like to vanish the wax pattern. It is a third object of the present invention to provide a method for manufacturing a casting using a lost wax processing, which enables fabricating a plurality of wax patterns in a relatively short time. It is a fourth object of the present invention to provide a method for manufacturing a casting using a lost wax process, which enables easily forming a concave portion into a free shape in which a flow path through which a cooling medium to cool a wax pattern flows or a heatsink is inserted at the time of fabricating the wax pattern. It is a fifth object of the present invention to provide a method for manufacturing a casting using a lost wax process, which enables rapidly cooling a wax pattern by allowing a cooing medium to flow through the flow path or inserting a heatsink into the concave portion, and enables precisely transferring a shape of a cavity in a wax pattern forming die to the wax pattern.

Means for Solving the Problems

A first aspect of the present invention is, as shown in FIG. 1(a) to FIG. 4(f), a method for manufacturing a casting using a lost wax process comprising steps of: fabricating a wax pattern forming die 13 to form a wax pattern 12; pouring a molten wax into a cavity 14a in the wax pattern forming die 13 to fabricate the wax pattern 12; bonding the wax pattern 12 to a casting sprue pattern 28 made of the wax and fabricated separately from the wax pattern 12 to fabricate an integrated pattern 29; coating a surface of the integrated pattern 29 with ceramics, sintering the pattern, and then melting and effusing the integrated pattern 29 to fabricate a mold 32 to mold a casting with a casting sprue 31; pouring a molten metal into the mold 32, curing the metal, and then crushing the mold 32 to take out the casting with a casting sprue 31; cutting off a casting sprue 33 from the casting with a casting sprue 31 to fabricate the casting 11, wherein the wax pattern forming die 13 is a resin forming die that is sterically formed by using stereolithography or a three-dimensional printer and has a heat resistance temperature higher than a temperature of the molten wax.

A second aspect of the present invention is the invention based on the first aspect and, as shown in FIG. 1(a) to FIG. 4(f), is characterized in that further the plurality of wax patterns 12 are fabricated at the time of fabrication of the wax pattern 12, and the plurality of wax patterns 12 are bonded to the single casting sprue pattern 28 in a tree shape at the time of fabrication of the integrated pattern 29 to fabricate the integrated pattern 29.

A third aspect of the present invention is the invention based on the first aspect and, as shown in FIG. 5, is characterized in that further flow paths 51 and 52 are formed in the wax pattern forming die 53 in proximity to an inner surface of a cavity 57 having a shape corresponding to the wax pattern at the time of fabrication of the wax pattern forming die 53 so that a cooling medium is allowed to flow through the flow paths 51 and 52.

A fourth aspect of the present invention is the invention based on the third aspect and, as shown in FIG. 5, is characterized in that further the cooling medium is pressurized air from a water tank air pump 61, and the wax is poured into the cavity 57 and cooled down while keeping the pressurized air flowing in from an inlet 51a of the flow path 51 and being discharged from an outlet 52b of the flow path 52.

A fifth aspect of the present invention is the invention based on the first aspect and, as shown in FIG. 6, is characterized in that further concave portions 81 and 82 extending from an outer surface of the wax pattern forming die 83 to the inside of the wax pattern forming die 83 close to an inner surface of a cavity 57 having a shape corresponding to the wax pattern are formed at the time of fabrication of the wax pattern forming die 83 so that insertion of heatsinks 91 and 92 into the concave portions 81 and 82 is enabled.

Effects of the Invention

In the method for manufacturing a casting using a lost wax process according to the first aspect of the present invention, since the wax pattern forming die is the resin forming die that is sterically formed by using the stereolithography or the three-dimensional printer and has a heat resistance temperature higher than a temperature of the molten wax, even if a shape of the wax pattern forming die is frequently changed in case of, e.g., manufacturing a prototype on a preliminary step of manufacturing mass-produced items, the shape of the wax pattern forming die can be changed with a relatively few man-hours. That is, since fabrication of a die for forming the wax pattern requires a large amount of costs and changing the shape of this die requires a relatively large amount of costs, as compared with the conventional method for forming a wax pattern having a hollow structure requiring a large amount of costs, even if the shape of the cavity in the die is frequently changed in the present invention, changing the three-dimensional shape data used in the stereolithography or the three-dimensional printer can suffice, and hence the shape of the wax pattern forming die can be changed with a relatively few man-hours. Furthermore, since the evaporative pattern fabricated with the use of the stereolithography is made of the photocurable resin that is a different material from the wax, the wax pattern can be fabricated from the regular wax in the present invention as compared with the conventional method for manufacturing a precision casting mold that has the problem requiring special facilities and others to vanish the evaporative pattern made of the photocurable resin, and hence special facilities and others to vanish the wax pattern are not required.

In the method for manufacturing a casting using a lost wax process according to the second aspect of the present invention, since the plurality of wax patterns are fabricated in wax pattern fabrication and the plurality of wax patterns are bonded to the single casting sprue pattern in the form of a tree at the time of fabrication of the integrated pattern to fabricate the integrated pattern, the plurality of wax patterns can be fabricated in a relatively short time. That is, as compared with the conventional method for manufacturing a precision casting forming die by which a plurality of evaporative patterns must be sequentially fabricated based on the stereolithography which relatively takes time, a plurality of wax patterns can be fabricated based on injection molding or the like in a relatively short time in the present invention.

In the method for manufacturing a casting using a lost wax process according to the third aspect of the present invention, since the flow paths are formed in the wax pattern forming die in proximity to the inner surface of the cavity having the shape corresponding to the wax pattern, at the time of fabrication of the wax pattern using the wax pattern forming die, the cooling medium draws heat of the wax in the cavity by allowing the cooling medium to flow through the flow paths, and hence the wax pattern can be rapidly cooled. Consequently, the shape of the cavity in the wax pattern forming die can be precisely transferred to the wax pattern. Further, since the wax pattern forming die is formed by using the stereolithography or the three-dimensional printer, the flow path through which the cooling medium flows can be easily formed into a free shape.

In the method for manufacturing a casting using a lost wax process according to the fourth aspect of the present invention, the cooling medium is the pressurized air from the water tank pump, the wax is poured into the cavity and cooled down while keeping this pressured air flowing in from the inlet of the flow path and being discharged to the outlet of the flow path, and hence the air discharged from the outlet of the flow path can be emitted into the atmosphere as it is. Consequently, as compared with a case where a liquid which requires a drainage treatment is used as the cooling medium, the drainage treatment can be eliminated, and hence the cooling medium can be relatively easily handled.

In the method for manufacturing a casting using a lost wax process according to the fifth aspect of the present invention, since the concave portions which extend from the outer surface of the wax pattern forming die to the inside of the same close to the inner surface of the cavity having the shape corresponding to the wax pattern is formed in the wax pattern forming die, the heatsinks draw heat of the wax in the cavity by inserting the heatsinks into these concave portions, and the wax pattern can be rapidly cooled. Consequently, the shape of the cavity in the wax pattern forming die can be precisely transferred to the wax pattern. Further, since the wax pattern forming die is formed by using the stereolithography or the three-dimensional printer, the concave portions into which the heatsinks are inserted can be easily formed into a relatively free shape.

BRIEF DESCRIPTION OF THE DRAWINGS

FIGS. 1(a)-1(e) is a process chart showing a procedure of fabricating a wax pattern by using a wax pattern forming die according to a first embodiment of the present invention;

FIG. 2(a) shows a state where a first cured thin layer having a predetermined shape is formed, FIG. 2(b) shows a state where a table is slightly moved downward to form a second cured thin layer, and FIG. 2(c) shows a state where the movable side resin die which is an optically formed product having a predetermined three-dimensional shape is formed;

FIG. 3(a) shows a state where a first cured thin layer having a predetermined shape is formed, FIG. 3(b) shows a state where the table is slightly moved downward to form a second cured thin layer, and FIG. 3(c) shows a state where a fixed side resin die which is an optically formed product having a predetermined three-dimensional shape is formed;

EMBODIMENTS TO CARRY OUR THE INVENTION

Figure 2A:
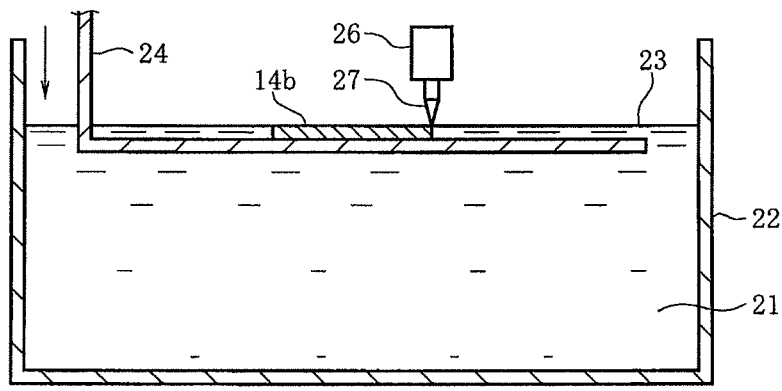
FIGS. 2(a)-2(c) is schematic cross-sectional views showing an optical lamination forming method for manufacturing a movable side resin die of the wax pattern forming die, where

A mode for carrying out the present invention will now be described with reference to the drawings.

<First Embodiment>

As shown in FIG. 1(a) to FIG. 3(c), a method for manufacturing a casting 11 using a lost wax process includes a step of fabricating a wax pattern forming die 13 to form a wax pattern 12, and a step of pouring a molten wax into a cavity 14a of this wax pattern forming die 13 to fabricate the wax pattern 12. The wax pattern forming die 13 is a molding die made of a resin which is sterically formed by using stereolithography or a three-dimensional printer and has a heat resistance temperature higher than a temperature of the molten wax. Furthermore, the wax pattern forming die 13 has a movable side resin die 14 in which a cavity 14a to fabricate the cylindrical wax pattern 12 is formed, and a fixed side resin die 16 in which a runner 16a through which the molten wax is poured into this cavity 14a is formed. The movable side resin die 14 is fitted in a non-illustrated movable base, the fixed side resin die 16 is fitted in a non-illustrated fixed base, and the movable side resin die 14 is configured to be movable in a direction to get closer and adhere tightly to the fixed side resin die 16 and a direction to recede and get away from the fixed side resin die 16 (FIGS. 1(a)-1(e)). Moreover, in this embodiment, the movable side resin die 14 and the fixed side resin die 16 are sterically formed by using the stereolithography (FIG. 2 and FIGS. 3(a)-3(c)). Specifically, the movable side resin die 14 and the fixed side resin die 16 as optically formed products are fabricated by optical stereolithography as typified by an optical lamination forming method.

Figure 2B:
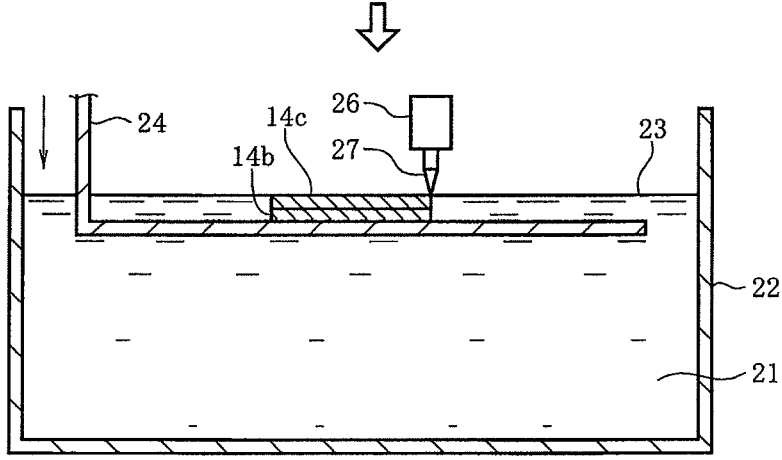
Figure 2C:
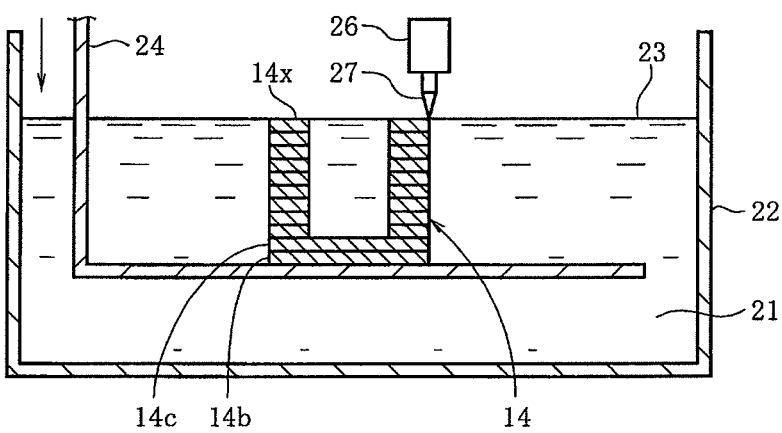
Figure 3:
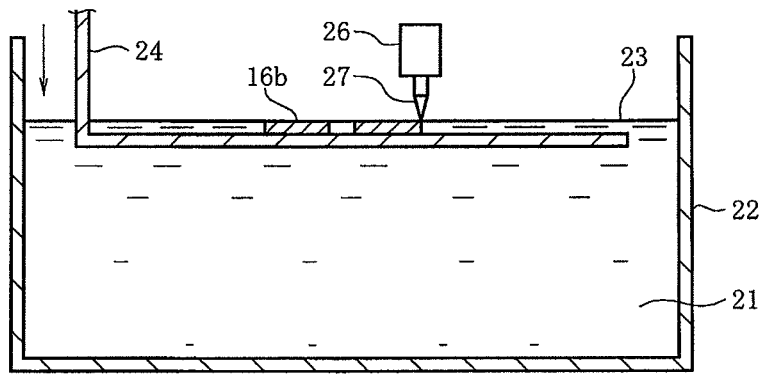
FIGS. 3(a)-3(c) is schematic cross-sectional views showing the optical lamination forming method for manufacturing a fixed side resin die of the wax pattern forming die, where
Figure 3:
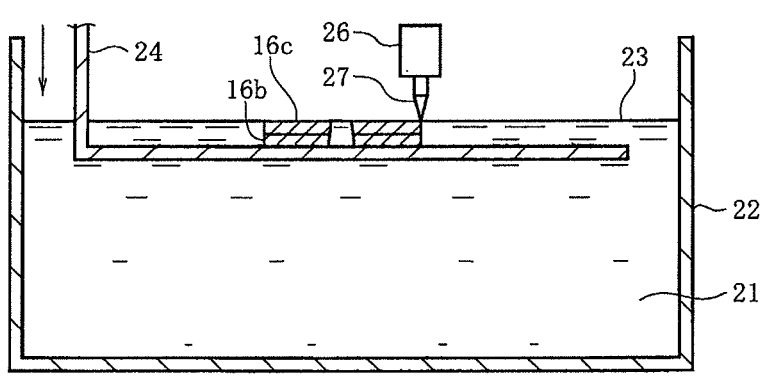
Figure 3:
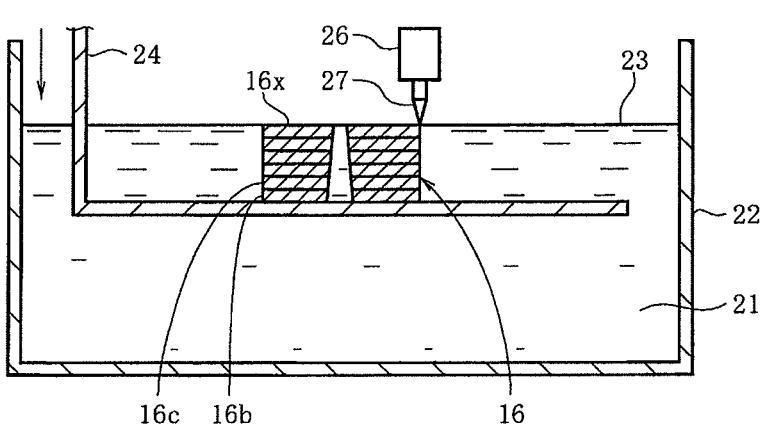

FIGS. 2(a) to (c) show steps of forming the movable side resin die 14 by the optical lamination forming method. Three-dimensional data of a formed product corresponding to the movable side resin die 14 is acquired in advance, this data is cut in round slices at equal intervals in computations and stored as slice data. First, as shown in FIG. 2(a), a table 24 movable in a perpendicular direction is arranged in a container 22 accommodating a liquid photocurable composition 21 so that an upper face of the table 24 is placed at a position that is slightly below a liquid level 23 of the liquid photocurable composition 21. The liquid photocurable composition 21 contains a radial polymerizable compound such as a (meta)acrylic monomer, a polymerizable monomer containing a cationically polymerizable compound such as an epoxy compound, a photopolymerization initiator, and others. After arranging the table 24, a thin layer of the liquid photocurable composition 21 on this table 24 is scanned with an ultraviolet laser beam 27 from an ultraviolet laser apparatus 26 in a predetermined pattern based on the stored data to form a first cured thin layer 14b having a predetermined shape. Then, as shown in FIG. 2(b), the thin layer of the liquid photocurable composition 21 is formed on the first curable thin layer 14b by slightly moving a position of the table 24 downward, and then this thin layer is scanned with the ultraviolet laser beam 27 in a predetermined pattern based on the stored data, thereby forming a second cured thin layer 14c having a predetermined shape. Thereafter, the same operation is repeated, and the movable side resin die 14 which is an optically formed product having a predetermined stereoscopic shape as an aggregation of the plurality of cured thin layers 14b, 14c, . . . , 14x is finally provided as shown in FIG. 2(c).

FIGS. 3(a) to (c) show steps of forming the fixed side resin die 16 by the optical lamination forming method, and this die is fabricated by the same method as the movable side resin die 14. Further, the fixed side resin die 16 which is the optically formed product having a predetermined stereoscopic shape which is an aggregation of a plurality of cured thin layers 16b, 16c, . . . , 16x is provided. To fabricate a wax pattern using the wax pattern forming die 13, first, the movable side resin die 14 is fitted into a movable base, the fixed side resin die 16 is fitted into a fixed base, the movable side resin die 14 is adhered tightly to the fixed side resin die 16 so that the cavity 14a of the movable side resin die 14 and the runner 16a of the fixed side resin die 16 are continuously connected and clamped (FIG. 1(*a*)), and the molten wax is poured into the runner 16a and the cavity 14a in this state (FIG. 1(*b*)). Then, after the poured wax is cooled and cured, the movable side resin die 14 is receded and disconnected from the fixed side resin die 16 (FIG. 1(*c*)). Furthermore, after a wax pattern with a wax pattern sprue 17 is taken out of the movable side resin die 14, a wax pattern sprue 18 is cut off from the wax pattern with the wax pattern sprue 17 to fabricate the wax pattern 12 (FIG. 1(*d*)). It is to be noted that the movable side resin die and the fixed side resin die are fabricated by the optical lamination forming method in this embodiment, but the movable side resin die and the fixed side resin die may be fabricated by a three-dimensional printer. Specifically, the movable side resin die and the fixed side resin die may be fabricated by a three-dimensional printer adopting an inkjet ultraviolet curing system using an acrylic photocurable resin, a three-dimensional printer adopting a thermal dissolution laminating system using an ABS resin (an acrylonitrile-butadiene-styrene copolymer synthetic resin), or a three-dimensional printer adopting a powder fixing system using powder.

Moreover, the wax pattern forming die 13 according to the present invention does not contain materials intended to make strength or heat resistance of a carbon material, a metal material, a ceramic material, or the like closer to that of a conventional die in terms of a material, i.e., materials other than a resin. Thus, a heat resistance temperature of the wax pattern forming die 13 according to the present invention is dependent on a material of a starting material resin, but it is in the range of 70 to 100° C. Additionally, as the wax poured into the cavity 14a of the wax pattern forming die 13, paraffin, a filler wax provided by dispersing particles of polymethylmethacrylate, particles of agarose, or particles of fibrous glass or calcium carbonate in the paraffin, or the like is used, and a melting temperature at the time of pouring this wax into the cavity 14a is in the range of 50 to 80° C. (usually, approximately 60° C.). In this specification, the "heat resistance temperature of the wax pattern forming die 13" means a maximum temperature at which the material constituting the wax pattern forming die 13 maintains the same configuration as that at a room temperature (25° C.) without causing alteration such as decomposition or dissolution.

Figure 4:
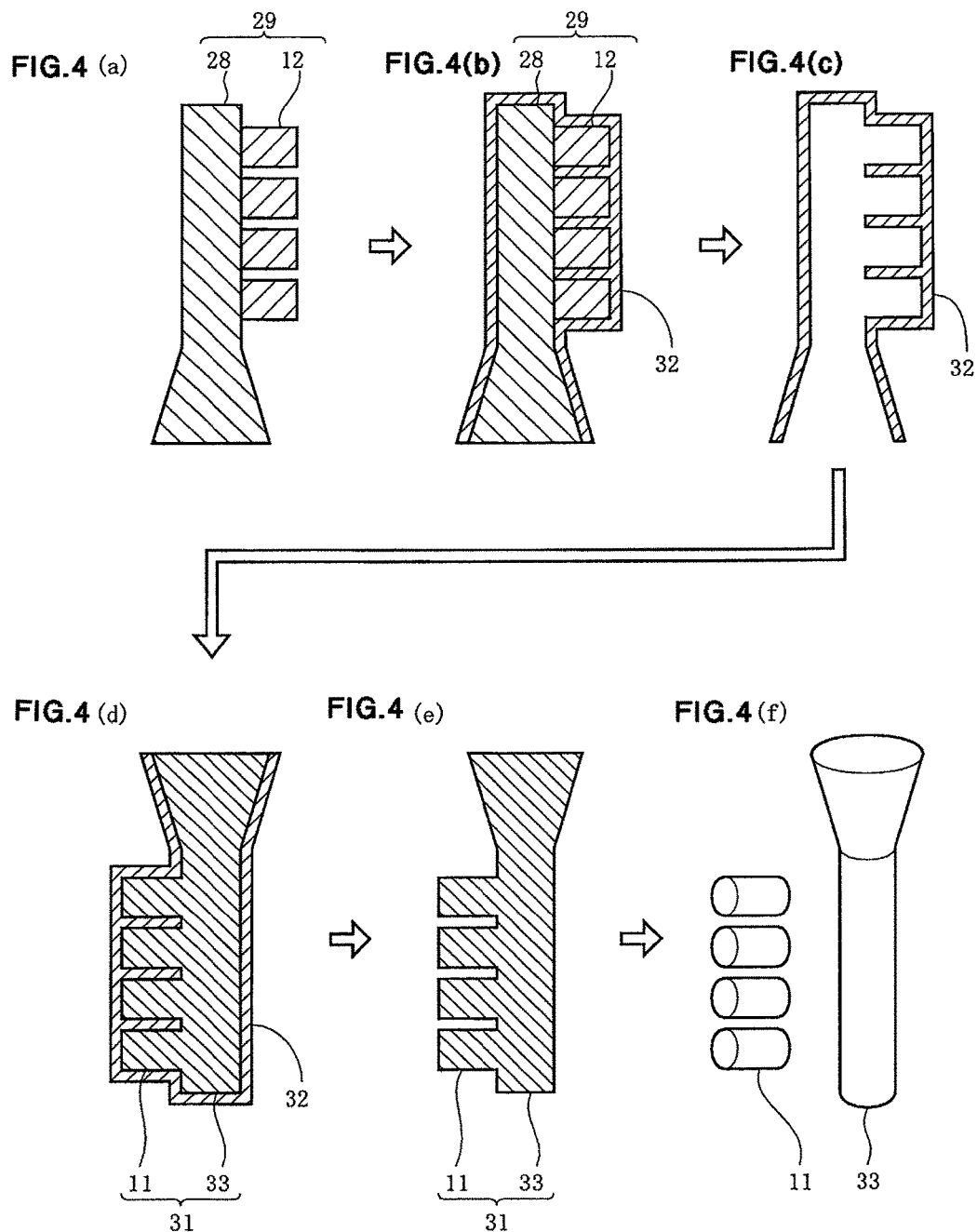
FIGS. 4(a)-4(f) is a process chart showing a procedure of manufacturing a casting based on a lost wax process using the wax pattern.

On the other hand, as shown in FIGS. 4(*a*)-4(*f*), the method for manufacturing the casting 11 using the lost wax process further includes a step of bonding the wax pattern 12 to a casting sprue pattern 28 made of the wax and fabricated aside from the wax pattern 12 to fabricate an integrated pattern 29 (FIG. 4(*a*)), a step of coating a surface of this integrated pattern 29 with ceramics, performing sintering, and then melting and effusing the integrated pattern 29 to fabricate a mold 32 to cast a casting with a casting sprue 31 (FIG. 4(*b*) and FIG. 4(*c*)), a step of pouring a molten metal into this mold 32, curing the molten metal, and then crushing the mold 32 to take out a casting with a casting sprue 31 (FIG. 4(*d*) and FIG. 4(*e*)), and a step of cutting off a casting sprue 33 from the casting with the casting sprue 31 to fabricate the casting 11 (FIG. 4(*f*)). In this embodiment, the casting sprue pattern 28 is formed with the use of the die, and a material of the molten wax poured into this casting sprue pattern 28 is the same as that of the molten wax poured into the wax pattern forming die 13. Additionally, in this embodiment, the plurality of wax patterns 12 are fabricated, the single casting sprue pattern 28 is fabricated, and the plurality of wax patterns 12 are bonded to this single casting sprue pattern 28 in the tree shape to fabricate the integrated pattern 29. Further, as the ceramics to be coated on the surface of the integrated wax 29, there is zirconium silicate, aluminum, silica, or the like, and sintering is carried out at a sintering temperature of the coating ceramics in the range of 1000 to 1100° C. Further, as the metal that is poured into the mold 32, there are many kinds of metals which can be treated in a precision casting method, e.g., an iron-based alloy, a copper alloy, an aluminum alloy, a titanium alloy, and others.

It is to be noted that, in this embodiment, the plurality of wax patterns are fabricated in the wax pattern fabrication, the plurality of wax patterns are bonded to the casting sprue pattern in the tree shape in the integrated pattern fabrication to fabricate the integral pattern, but the single wax pattern may be fabricated in the wax pattern fabrication, and the single wax pattern may be bonded to the casting sprue pattern in the integrated pattern fabrication to fabricate the integrated pattern. Furthermore, in this embodiment, the casting sprue pattern is fabricated by using the casting sprue pattern forming die made of the metal, but the casting sprue pattern forming die may be fabricated by using the optical lamination forming method or the three-dimensional printer, and the casting sprue pattern may be fabricated by using this casting sprue pattern forming die.

In the thus configured method for manufacturing the casting 11 using the lost wax process, since the wax pattern forming die 13 is a resin forming die that is sterically formed by using the stereolithography or the three-dimensional printer and has the heat resistance temperature higher than a temperature of the molten wax, the shape of the wax pattern forming die 13 can be changed with a relatively few man-hours even if the shape of the wax pattern forming die 13 is frequently changed in case of manufacturing, e.g., a prototype on a preliminary step of manufacturing mass-produced items. That is, in the conventional method for forming a wax pattern having a hollow structure, since fabrication of a die for forming a wax pattern requires a large amount of costs and changing a shape of this die requires a relatively large amount of costs, enormous costs are required when a shape of a cavity in the die is frequently changed, whereas, in the wax pattern forming die 13 according to this embodiment, changing the three-dimensional shape data used in the stereolithography or the three-dimensional printer can suffice even if the shape of this wax pattern forming die 13 is frequently changed, and hence the shape of the wax pattern forming die 13 can be changed with a relatively few man-hours. Moreover, in the conventional method for manufacturing a precision casting mold, since an evaporative pattern fabricated by using the stereolithography is made of a photocurable resin which is a material different from the wax, there is a problem that special facilities and the like are required to vanish this evaporative pattern made of the photocurable resin, whereas, in this embodiment, the wax pattern 12 can be fabricated with the use of the regular wax, and hence no special facilities and others are required to vanish the wax pattern 12. Additionally, in this embodiment, since the plurality of wax patterns 12 are bonded to the single casting sprue pattern 28 in the tree shape to fabricate the integrated pattern 29, the plurality of wax patterns 12 can be fabricated in a relatively short time. That is, the plurality of evaporative patterns must be sequentially fabricated by the stereolithography which relatively requires time in the conventional method for manufacturing a precision casting mold, whereas the plurality of wax patterns 12 can be fabricated in a relatively short time by injection molding or the like in this embodiment.

<Second Embodiment>

Figure 5:
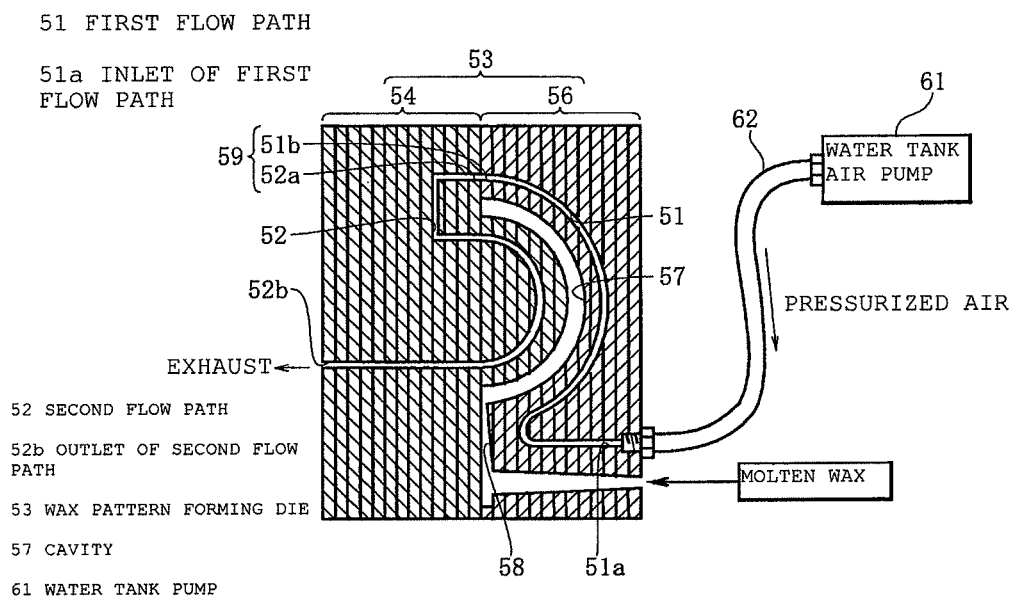
FIG. 5 is a cross-sectional block diagram of a wax pattern forming die according to a second embodiment of the present invention.

FIG. 5 shows a second embodiment according to the present invention. In this embodiment, at the time of fabricating a wax pattern forming die 53, first and second flow paths 51 and 52 are formed in the wax pattern forming die 53 in proximity to an inner surface of a cavity 57 having a shape corresponding to a wax pattern respectively so that a cooling medium can flow through these first and second flow paths 51 and 52. Specifically, in this embodiment, the wax pattern is formed into a bowl-like shape. Further, the wax pattern forming die 53 has a fixed side resin die 56 in which an outer surface of the cavity 57 for fabrication of the bowl-like wax pattern is formed and a runner 58 for pouring a molten wax into the cavity 57 is also formed, and a movable side resin die 54 in which an inner surface of the cavity 57 is formed. Furthermore, assuming that a volume of the cavity 57 is 1, a volume of the wax pattern forming die 53 is 40 to 200. The first flow path 51 through which the cooling medium flows is formed in the fixed side resin die 56 at a position close to the inner surface of the bowl-like cavity 57, and the second flow path 52 through which the cooling medium flows is formed in the movable side resin die 54 at a position close to the inner surface of the bowl-like cavity 57. Here, "close to the inner surface of the cavity 57" means being placed in the range of 2 to 15 mm from the curved inner surface of the bowl-like cavity 57 on the outer side or the curved inner surface of the bowl-like cavity 57 on the inner side. In this embodiment, air is pressurized to flow as the cooling medium through the first and second flow paths. It is to be noted that a liquid such as a gas or water other than the air may be pressurized to flow through the first flow path and the second flow path. However, in this case, a drainage treatment is required. When the wax pattern forming die 53 is manufactured by the stereolithography or three-dimensional printer, each of the first and second flow paths 51 and 52 can be formed with a diameter falling within the range of 1 to 6 mm that enables passage of a pressurized gas such as pressurized air, or preferably a diameter of 2 mm or less, or a diameter falling within the range of 4 to 6 mm that enables passage of a pressured liquid such as pressurized water even if the cavity 57 has a complicated shape. Moreover, the first and second flow paths 51 and 52 can be formed at an interval of 1 to 5 mm in proximity to the cavity 57.

On the other hand, in mold clamping of the wax pattern forming die 53, an outlet 51*b* of the first flow path 51 and an inlet 52*a* of the second flow path 52 face to each other to form a connection port 59. Consequently, the first low path 51 and the second flow path 52 form one continuous flow path. In this embodiment, the cooling medium is the pressurized air from a water tank air pump 61, the wax is poured into the cavity 57 and cooled down while keeping the pressurized air flowing in from an inlet 51*a* of the first flow path 51 and flowing out from an outlet 52*b* of the second flow path 52 through the connection port 59. Specifically, an air pipe 62 of the single small water tank air pump 61 that operates with a power supply of 100 V is connected to the inlet 51*a* of the first flow path 51. This water tank air pump 61 is a pump that brings about aeration in a water tank for aquarium fish such as goldfish or tropical fish. Further, a known wax injection molding apparatus (not shown) is connected to the runner 58, and this injection molding apparatus is loaded with the wax. Other structures are the same as those in the first embodiment.

In the thus configured method for manufacturing a casting using the lost wax process, since the first and second flow paths 51 and 52 are formed in the wax pattern forming die 53 in proximity to the inner surface of the cavity 57 having the shape corresponding to the wax pattern, the pressurized air draws heat from the wax in the cavity 57 by allowing the pressurized air to flow through the first and second flow paths 51 and 52 at the time of fabrication of the wax pattern using the wax pattern forming die 53, thereby rapidly cooling the wax pattern. Consequently, the shape of the cavity 57 in the wax pattern forming die 53 can be precisely transferred to the wax pattern. Furthermore, since the wax pattern forming die 53 is formed by using the stereolithography or the three-dimensional printer, the first and second flow paths 51 and 52 through which the pressurized air flows can be easily formed into free shapes. Moreover, the wax is poured into the cavity 57 and cooled down while keeping the pressurized air flowing in from the inlet 51*a* of the first flow path 51 and being discharged from the outlet 52*b* of the second flow path 52 through the connection port 59 by using the water tank air pump 61, and hence the pressured air discharged from the outlet 52*b* of the second flow path 52 can be directly emitted into the atmosphere. Consequently, as compared with a case where a liquid requiring a drainage treatment is used as the cooling medium, since this embodiment does not require the drainage treatment, the pressurized air as the cooling medium can be relatively easily treated. Other operations are substantially the same as the operations in the first embodiment, and hence a tautological description will be omitted.

<Third Embodiment>

Figure 6:
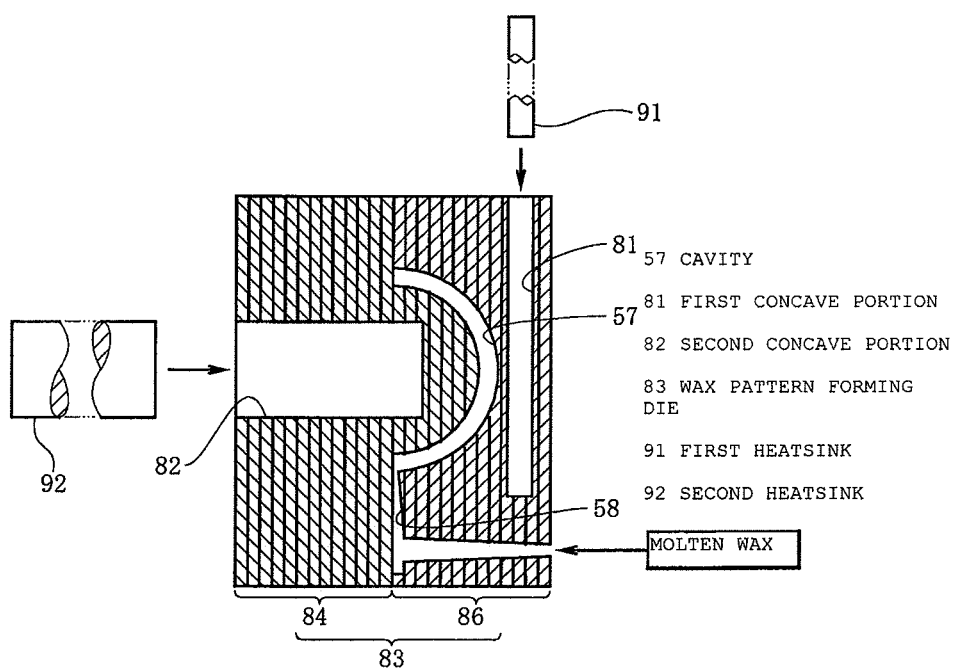
FIG. 6 is a cross-sectional block diagram of a wax pattern forming die according to a third embodiment of the present invention.

FIG. 6 shows a third embodiment according to the present invention. In FIG. 6, like reference numerals denote parts equal to those in FIG. 5. In this embodiment, first and second concave portions 81 and 82 are formed respectively at the time of fabrication of a wax pattern forming die 83, the first and second concave portions 81 and 82 extending from an outer surface of the wax pattern forming die 83 to the inside of the wax pattern forming die 83 which is close to an inner surface of a cavity 57 having a shape corresponding to a wax pattern. The first and second concave portions 81 and 82 are configured so that first and second heatsinks 91 and 92 can be inserted into these portions respectively. Specifically, in this embodiment, the wax pattern is formed into a bowl-like shape like the second embodiment. Furthermore, the first concave portion 81 into which the first heatsink 91 is inserted is formed at a portion in a fixed side resin die 86 of the wax pattern forming die 83 close to the inner surface of the cavity 57, and the second concave portion 82 into which the second heatsink 92 is inserted is formed at a portion in a movable side resin die 84 close to the inner surface of the cavity 57. As a material of the first and second heatsinks 91 and 92, there is a metal having high thermal conductivity such as aluminum, an aluminum alloy, copper, or a copper alloy, and ceramics having high thermal conductivity such as an aluminum nitride may be used. Moreover, it is preferable to form each of the first and second concave portions 81 and 82 into a cylindrical shape, a square columnar shape, or any other columnar shape, and preferable to form each of the first and second heatsinks 91 and 92 into a cylindrical shape, a square columnar shape, or any other columnar shape corresponding to the first and second concave portions. Additionally, in a state where the first heatsink 91 is inserted into the first concave portion 81 and the second heatsink 92 is inserted into the second concave portion 82, the molten wax is poured into the cavity 57 and cooled down. Other structures are the same as those in the second embodiment.

In the thus configured method for manufacturing a casting using the lost wax process, since the first and second concave portions 81 and 82 extending from the outer surface of the wax pattern forming die 83 to the inside of the wax pattern forming die 83 close to the inner surface of the cavity 57 corresponding to the wax pattern are formed respectively, the first and second heatsinks 91 and 92 draw heat from the wax in the cavity 57 by inserting the first and second heatsinks 91 and 92 into the first and second concave portions 81 and 82 respectively, thereby rapidly cooling the wax pattern. Consequently, the shape of the cavity 57 in the wax pattern forming die 83 can be precisely transferred to the wax pattern. Additionally, since the wax pattern forming die 83 is formed by using the stereolithography or the three-dimensional printer, each of the first and second concave portions 81 and 82 into which the first and second heatsinks 91 and 92 are inserted can be easily formed into a relatively free shape. Other operations are substantially the same as the operations in the second embodiment, and hence a tautological description will be omitted.

The method for manufacturing a casting using a lost wax process according to the present invention can be used for easily and cheaply manufacturing castings for trial production of toys, convenience goods, automobile components, or electrical components.

The invention claimed is:

1. A method for manufacturing a casting using a lost wax process, comprising: fabricating a wax pattern forming die to form a wax pattern; pouring a molten wax into a cavity in the wax pattern forming die to fabricate the wax pattern; bonding the wax pattern to a casting sprue pattern made of the wax and fabricated separately from the wax pattern to fabricate an integrated pattern; coating a surface of the integrated pattern with ceramics, performing sintering, and then melting and effusing the integrated pattern to fabricate a mold to mold a casting with a casting sprue; pouring a molten metal into the mold, curing the metal, and then crushing the mold to take out the casting with a casting sprue; cutting off a casting sprue from the casting with a casting sprue to fabricate the casting, wherein the wax pattern forming die is a resin forming die that is sterically formed by using stereolithography or a three-dimensional printer and has a heat resistance temperature higher than a temperature of the molten wax, and a flow path, which extends along the whole length of an inner surface of a cavity on each of opposite sides of the cavity, is formed in the wax pattern forming die, and a first flow path on one side of the cavity and a second flow path on another side of the cavity form the flow path into one continuous flow path in mold clamping of the wax pattern forming die.

2. The method for manufacturing a casting using a lost wax process according to claim 1, wherein the plurality of wax patterns are fabricated at the time of fabrication of the wax pattern, and the plurality of wax patterns are bonded to the single casting sprue pattern in a tree shape at the time of fabrication of the integrated pattern to fabricate the integrated pattern.

3. The method for manufacturing a casting using a lost wax process. according to claim 1, wherein the flow path is formed in the wax pattern forming die in proximity to the inner surface of the cavity having a shape corresponding to the wax pattern at the time of fabrication of the wax pattern forming die so that a cooling medium is allowed to flow through the flow path.

4. The method for manufacturing a casting using a lost wax process according to claim 3, wherein the cooling medium is pressurized air from a water tank air pump, and the wax is poured into the cavity and cooled down while keeping the pressurized air flowing in from an inlet of the flow path and being discharged from an outlet of the flow path.

\* \* \* \* \*